Figure 2:
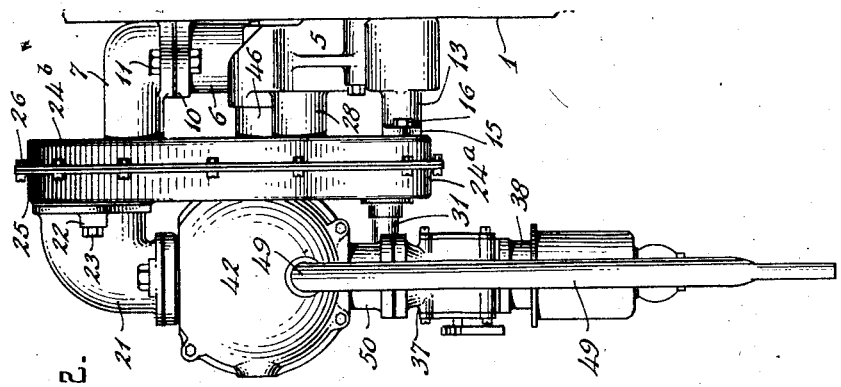

May 1, 1928.

W. P. DEPPÉ

1,667,886

MANIFOLD FOR INTERNAL COMBUSTION ENGINES

Filed July 15, 1922  3 Sheets-Sheet 1

INVENTOR
Wm. P. Deppé
BY
*[signature]*
ATTORNEY

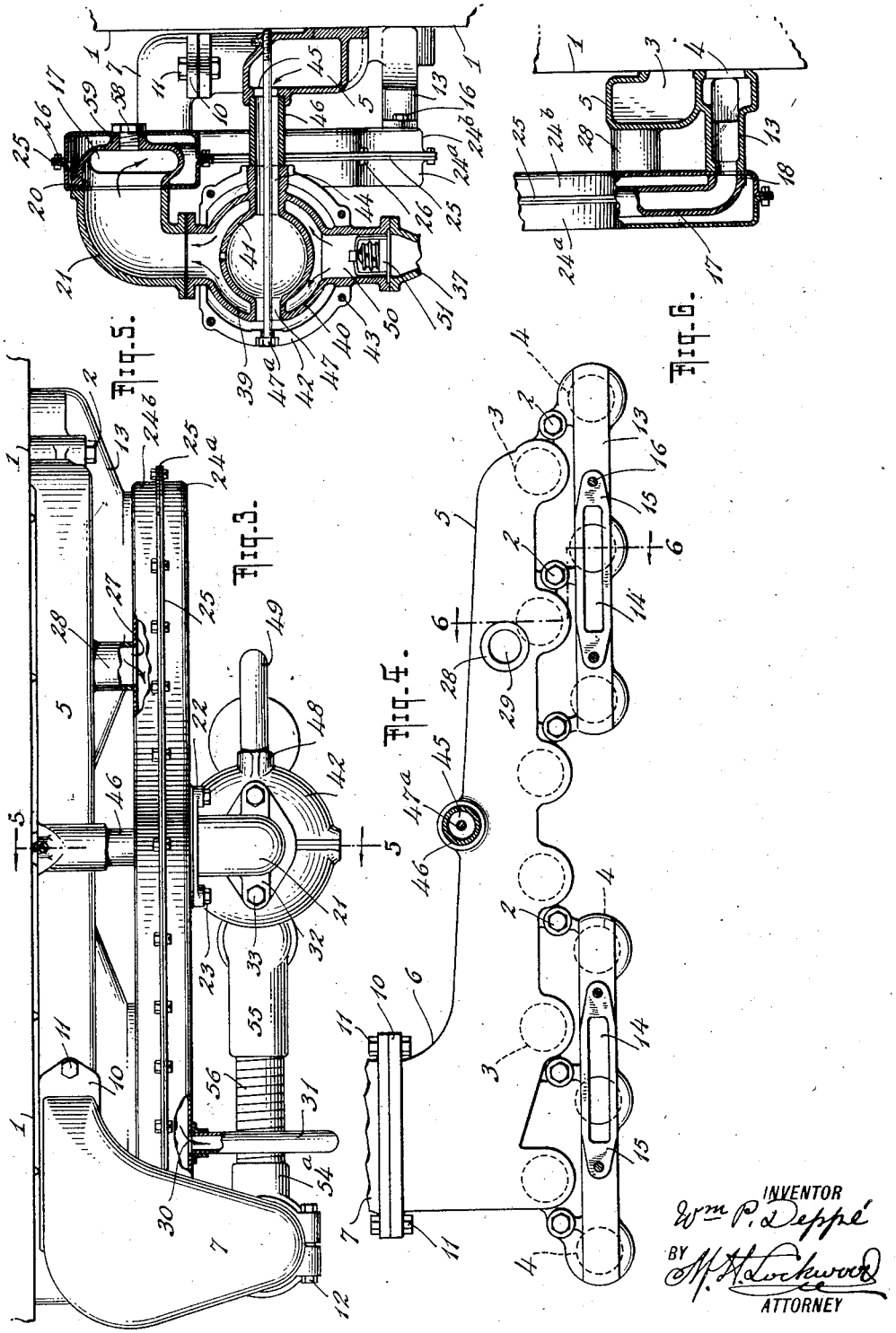

May 1, 1928. 1,667,886
W. P. DEPPÉ
MANIFOLD FOR INTERNAL COMBUSTION ENGINES
Filed July 15, 1922 3 Sheets-Sheet 3
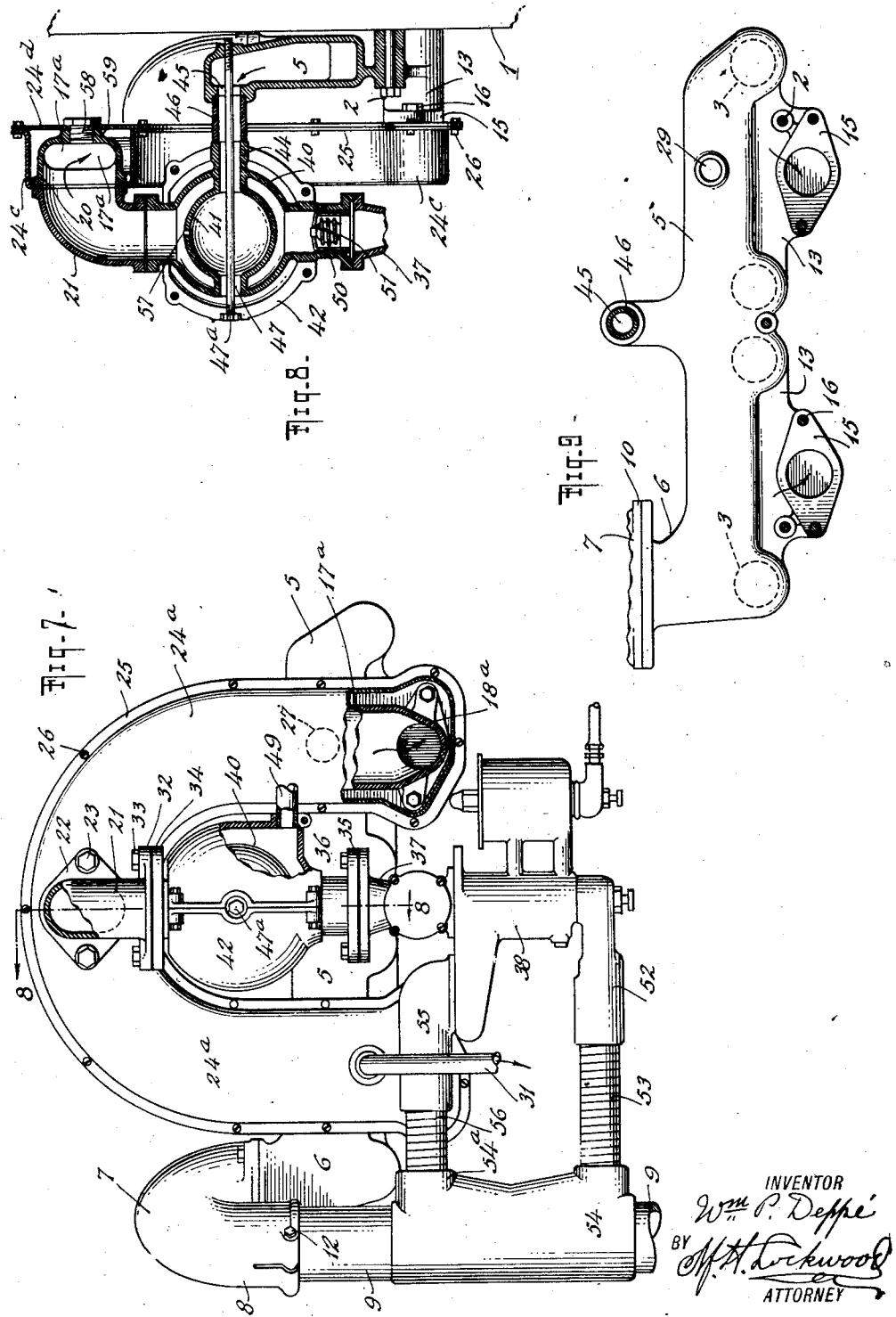

Patented May 1, 1928.

1,667,886

UNITED STATES PATENT OFFICE.

WILLIAM P. DEPPÉ, OF BRIGHTWATERS, NEW YORK.

MANIFOLD FOR INTERNAL-COMBUSTION ENGINES.

Application filed July 15, 1922. Serial No. 575,300.

My improvement relates more particularly to manifolds for producing and maintaining a superheated dry gaseous mixture and delivering it to the engine.

In operating an internal combustion engine according to my method, as described more particularly in my Patent, No. 1,335,665, of March 30, 1920, for internal combustion engines, it is obvious that various forms of apparatus may be used and my present improvement merely provides for commercial forms of apparatus of this character for four and six cylinder engines of the L-head type.

While the details of the devices herein described may be varied and the units made of the same or similar metal, it is found desirable, in carrying out my improvement to construct or cast the fuel mixture conduits and units of the intake manifold from metal or alloys, having a comparatively high heat conductivity and enclose the units so formed in jackets of sheet metal of lower heat conductivity. This permits less weight of metals to be used. The enclosing jacket is preferably stamped or formed of sheet metal in two pieces which are secured together about and in contact with certain portions of the intake manifold in such a manner as to leave a chamber substantially uniformly spaced from the arms of the intake manifold, so that the latter may be heated by passing exhaust gases through the chamber thus formed.

By this construction, it is evident that the jacket enclosing the intake manifold may be connected by a suitable pipe with the exhaust manifold and the proportions of the inlet and outlet pipe to the jacket may be so designed that the required proportions of exhaust gases may be passed through the jacket. This is desirable in carrying out my improved method, in order that the mixture may be accurately maintained and delivered to the engine in the proper superheated dry gaseous state.

It will be understood also that the points of metal contact between the exhaust gas conduits and intake conduits furnish a certain amount of heat to the mixture, and care should be taken in designing and applying superheat gas manifolds to see that this metal contact is never great enough to cause the temperature of the intake conduits to build up, independent of the heat delivered by the flowing exhaust gases in pipes and jackets, which can be so proportioned that there is automatic heat delivery according to the amount of fuel mixture with relation to speed of engine and throttle opening.

In operating an engine according to my method as described in the patent above referred to, it is desirable to provide means for breaking up the fuel particles, immediately after they leave the carburetor, by mechanical or other means so as to facilitate rapid vaporization, and produce a homogeneous mixture. In my present apparatus this is preferably accomplished by my improved heater and mixer, substantially as or similar to that shown and described in my Patent, No. 1,189,797 of July 4, 1916. It will be understood, however, that any other suitable means may be employed in connection with my improved superheating manifold.

Figure 1:
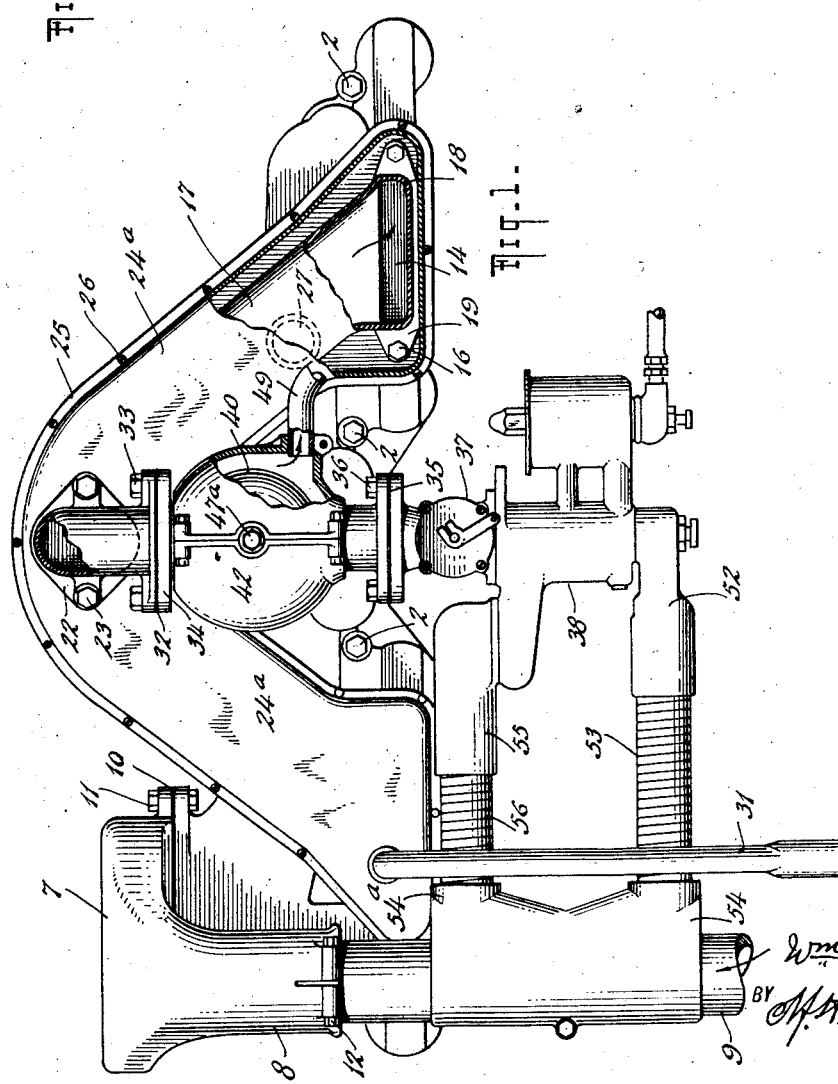

My improved manifold for four and six cylinder engines are more particularly shown in the accompanying drawings, in which Fig. 1 shows my improved manifold and the complete lay-out for a six-cylinder engine in side elevation with some portions in section; Fig. 2 is an end elevation of the lay-out as shown in Fig. 1; Fig. 3 is a top plan view of the six-cylinder lay-out with the jacket broken away at certain points; Fig. 4 is a side elevation of the six-cylinder exhaust manifold and the inlet ends of the intake manifold, these parts being formed as an integral casting; Fig. 5 is a vertical transverse section through the lay-out on the line 5—5 of Fig. 3; Fig. 6 is a detail sectional view on the line 6—6 of Fig. 4; Fig. 7 is a side elevation of the complete lay-out for a four-cylinder L-head engine, with certain portions broken away; Fig. 8 is a vertical transverse section of the upper portion of the lay-out on the line 8—8 of Fig. 7, and Fig. 9 is a side elevation of the integral exhaust manifold casting and inlet openings.

Referring to the drawings, it will be seen that the form of my improved manifold as shown in Figs. 1 to 6 inclusive, is arranged and adapted for attachment to the ordinary double block six-cylinder L-head engine and although the complete engine is not here shown, the engine blocks which are planed off to attach thereto the intake and exhaust manifolds are represented at 1, and the manifold may be attached thereto in the usual manner, by suitable lag bolts 2, as indicated in the drawings. The exhaust ports are indicated by the dotted circles 3, as seen in Fig. 4 of the drawings, and the intake ports by the dotted circles 4. The exhaust manifold 5 is preferably provided with suitable openings adapted to register with the port openings 3 and, as more particularly shown in Figs. 3 and 4, the exhaust manifold preferably increases in cross-sectional area toward the left, where it turns upward at 6 and is provided with a flanged opening connecting it with the opening and in an over-hanging conduit member 7, which is continued downward in circular form at 8, as seen in Fig. 1 of the drawings and is connected with the exhaust pipe 9. The flanges 10 between the upper end 6 of the exhaust manifold and the member 7 are secured together by suitable bolts 11, as shown in Figs. 1 and 4 of the drawings. The exhaust pipe 9 is clamped to the lower end of the round portion 8 of the exhaust manifold conduit 7, by the clamping bolt 12, as shown in Figs. 1 and 3 of the drawings.

As more particularly shown in Figs. 4, 5 and 6 of the drawings, it will be seen that the exhaust manifold 5 is cast integral with a flaring inlet chamber 13, adapted to cover three of the inlet ports 4, there being two such flaring inlet chambers, one for each set of three-cylinders as indicated in Figs. 3 and 4 of the drawings. The opening 14 of the flaring chamber 13 is provided with a planed face and suitable flanges 15 for attaching thereto the spreader arms of the inlet manifold, the latter being secured thereto by suitable bolts 16, as shown in Fig. 1 and in section, in Fig. 4.

The spreader arms of the intake manifold which are connected to the inlet openings 14, preferably comprises an inverted substantially U-shaped conduit 17 of flattened cross-section as shown in Fig. 5 of the drawings, and is of substantially uniform cross-sectional area throughout, except that the lower ends thereof at 18 flare out and open laterally to register with the inlet openings 14, as indicated in Fig. 1 of the drawings. Suitable flanges 19 are provided for cooperation with the bolts 16 and flanges 15 for securing the intake manifold spreader arms to the flaring inlet chamber 13, as previously indicated.

The central portion of the spreader arms 17 on one side thereof is preferably provided with a tubular boss 20 adapted to register with an elbow shaped riser 21, as seen in Figs. 3 and 5 of the drawings. The boss 20 and the adjacent end of the elbow 21 are provided with suitable flanges 22, through which bolts 23 are passed for securing the two parts together, as shown in Figs. 1 and 2 of the drawings.

As previously indicated, the spreader arms 17 may be and preferably are cast integral of bronze or some other suitable metal or alloy, having relatively high heat conductivity and as indicated, the spreader arms are preferably flattened in cross section, in whole or in part, so that any heat applied thereto will be more effective in heating the mixture passing therethrough. In order that the spreader arms 17 may be satisfactorily and effectively heated, the entire spreader arm conduit 17 is preferably enclosed and surrounded by a jacket 24, which in the present instance, is formed of stamped sheet steel, which has a relatively lower heat conductivity than the metal of the spreader arms 17. The jacket 24 (24ᵃ—24ᵇ) enclosing the intake spreader arms 17 is preferably made up of two sections 24ᵃ and 24ᵇ, each provided with a peripheral flange 25 and the two members are secured together by suitable bolts and nuts 26, passing through the flanges 25, as indicated in Figs. 3 and 5 of the drawings. The thin sheet metal jacket 24ᵃ—24ᵇ is spaced uniformly from the spreader arms 17, and, as indicated in Fig. 6 of the drawings, the wall of 24ᵇ passes between the flanges 15 and 19, and is, therefore, clamped and held in place by the bolts 16, as shown in Fig. 1 of the drawings. The sheet metal jacket wall 24ᵃ also passes between the flanges 22 between the elbow 21 and boss 20, and the three parts are clamped firmly together by the bolts 23. Thus, it will be seen that the sheet metal jacket 24ᵃ—24ᵇ, forming a chamber about the intake manifold spreader arms 17, is firmly secured in place by the same bolts which hold the spreader arms.

The jacket members 24ᵃ and 24ᵇ are provided with suitable openings registering respectively with the openings 14 and 18 and the openings in the boss 20 and elbow 21, so as to provide for the unobstructed passage of the mixture through the intake manifold, while at the same time completely enclosing the manifold spreader arms 17 by the jacket 23, as described. This arrangement also provides for making a substantially gas-tight chamber within the jacket members 23ᵃ—24ᵇ surrounding the intake manifold spreader arms 17.

One leg of the jacket member 24ᵇ is provided with an opening at 27, which is connected by means of a short pipe 28, with the exhaust manifold 5, which is provided with an opening at 29, as will be seen in Figs. 3 and 4 of the drawings. The front jacket member 24ᵃ in the other leg thereof is provided with an opening at 30, which is fitted with an outwardly and downwardly extending exhaust pipe 31, as will be seen in Figs. 1 and 3 of the drawings, thereby providing means for surrounding the intake spreader arms 17 with hot exhaust gases for heating the mixture passing therethrough. It will be obvious that by regulating the size of the respective inlet and exhaust pipes 28 and 31, the heating effect of the exhaust gases on the flattened spreader arms of the intake manifold may be regulated according to the requirements of any particular engine with which the apparatus may be connected.

For preliminary heating and mixing the combustibles and air of the mixture, before it enters the intake manifold proper, the elbow riser 31 is preferably connected by flanges 32 and bolts 33 to the heater and mixer 34, which is provided with flanges at 35, at the lower end thereof where it is secured by bolts 36 to the upper end 37 of the carburetor 38.

The heater and mixer 34 is preferably of the form substantially as shown and described in my pending application, Ser. No. 537,404, filed February 18, 1922, and comprises a substantially spherical shaped heating conduit 39, through which the mixture passes on its way to the elbow 31, as more particularly illustrated in Fig. 5 of the drawings. The conduit 39 is formed between the outer spherical wall 40 and the inner bulb 41, which are preferably cast integral, of bronze or other suitable metal of relatively high heat conductivity. The spherical conduit thus formed is preferably surrounded and enclosed by a jacket 42, which as here illustrated is preferably made up of two hemispherical cast iron shells, which are secured together by suitable bolts 43, about the inner conduit member 40—41, and spaced therefrom to permit the circulation of exhaust gases about the outer wall 40 of the conduit. The inner bulb 41 is provided with a tubular opening 44 passing through the wall 40 and also through the jacket 42, so that the hot exhaust gases from the exhaust pipe 5 may be conducted into the interior of the bulb 41 for heating the spread-out or sheeted gaseous mixture on the inside of the latter. For this purpose the exhaust pipe 5 is provided with an opening at 45, which is connected by a short pipe 46, with the tubular opening 44 and leads to the interior of the bulb 41, as will be seen in Fig. 5 of the drawings. The bulb 41 is also provided with an outlet opening 47, which is adapted to permit the exhaust gases to pass from the bulb 41 into the chamber formed between the wall 41 and the jacket 42, so that the exhaust gases may circulate around the outer wall of the mixture conduit and heat the outside of the sheeted mixture. A rod or bolt 47ª is passed through the jacket 42 and through the openings 47 and 44 into the wall of the exhaust pipe 5 to secure the parts tightly together. The jacket 42 is provided with an opening at 48 to permit the exit therefrom of the exhaust gases through the outwardly and downwardly extending pipe 49, as shown in the Figs. 2 and 3 of the drawings.

The spherical sheeting and heating conduit 39 with a cylindrical conduit at the inlet end 50 of the heater and mixer, the upper portion of which is also preferably surrounded by the jacket 42, so as to be heated by the exhaust gases passing therethrough. The cylindrical inlet opening 50 is preferably provided with a rotary mechanical mixer 51, which may be of the usual or any preferred form, although any mechanical mixing device, capable of finely atomizing the liquid may be used.

While the air to carburetor inlets may be at atmospheric temperature, I prefer, as shown and described in my pending application above referred to, that all the air passing through the carburetor or metering device 38 should be preheated. For this purpose, the primary air conduit 52 is connected by means of the pipe 53 with the lower end of a stove 54, surrounding the exhaust pipe 9 and through which the air enters on its way to the carburetor. The secondary or auxiliary air conduit 55, by means of the pipe 56, is connected at 54ª to the upper end of the stove 54 and all of the auxiliary air is likewise heated. In using preheated air care should be taken to proportion the air housings on the exhaust pipe to fix limits of temperatures, so as not to have the air heated to such a degree at any speed or throttle opening as to cause boiling of the lighter cuts of fuel in the meter piping and bowls, and thereby lose control of the flow of fuel.

The operation of my improved apparatus is simple and efficient and requires no adjustments on the part of the operator, for the dimensions of the various jackets, conduits and pipes are so proportioned that the engine will be supplied with a superheated dry gaseous mixture under all conditions of operation without any attention or regulation by the operator, other than such as may be done by operation of the throttle. The air, entering the carburetor, after picking up the combustibles passes through the throttle in the upper end 57 of the carburetor and enters the lower end 50 of the heater and mixer where the mixture first encounters the rotary mixer 51, whereby the particles are broken up and atomized after which the mixture enters the heater conduit 39 and is spread out and sheeted and the temperature raised sufficiently to completely vaporize the fuel particles. The mixture then passes through the elbow riser 21 into the spreader arms 17 where it is again flattened or sheeted and heated on both sides by the exhaust gases surrounding the spreader arms in the jacket 24. The mixture is thereby superheated and maintained and delivered as a superheated dry gas to the chamber 13, from which it is admitted to the engine through the inlet ports 4.

While the apparatus thus far described is very satisfactory for the use of superheated mixtures at usual commercial compression pressures, higher compression pressures are desirable, in operation, for greater thermal efficiency. Therefore, for the purpose of ionizing and diluting the mixture, so as to influence the action thereof in the cylinders of the engine, and enable the engine to operate at higher compression pressures and with sustained pressures after ignition of the mixture, it is preferably to introduce into the highly heated and completely vaporized mixture, a predetermined amount of live exhaust gases. This is preferably done by providing the bulb 41 in the heater and mixer with a hole or holes at 57 which are adapted to permit live exhaust to pass into the stream of mixture substantially central thereof and in the direction of flow. This method of utilizing exhaust gases is more particularly shown and described in my pending application, Ser. No. 463,340, filed April 21, 1921.

The lay-out for a four-cylinder engine of the L-head type is more particularly shown in Figs. 7 to 9 inclusive, from which it will be seen that the construction is substantially the same as that shown in Figs. 1 to 6 for the six-cylinder engine, the principal difference being that in the four-cylinder lay-out the manifold spreader arms 17$^a$ are more U-shaped, so as to bring the ends 18$^a$ thereof closer together. The pipe connections and other elements of the four-cylinder lay-out are substantially the same as those described for the six-cylinder lay-out, with some of the proportions changed slightly to accommodate the smaller lay-out. The same reference characters are given to corresponding parts, so that the previous description will suffice for the four-cylinder lay-out. There is one other difference to which attention may be called, and that is that the jacket members 24$^c$ and 24$^d$ are slightly different in shape, in that the member 24$^c$ is constructed like a deep U-shaped pan and covered by a flat plate 24$^d$, so as to complete the jacket surrounding the U-shaped manifold spreader arms 17$^a$. Obviously, however, this construction does not differ in principle from that shown and described in Figs. 1 to 6 inclusive in connection with the six-cylinder lay-out.

It will be noted that in both lay-outs an opening is preferably provided at 58 through a boss 59 on the intake manifold spreader arms 17 and 17$^a$, for connection with a priming tank in the usual or any preferred manner.

These forms of applicant's improved manifold layouts for carrying out his method of producing and delivering to the engine a superheated dry gaseous mixture represents the preferred forms which have been commercialized and which are being manufactured and made available to the public. It will be understood, however, that I am not limited to the particular construction shown and described, for various modifications in the specific details thereof may be made without departing from the spirit and scope of the invention.

I claim :—

1. In an internal combustion engine, the combination with an integral casting comprising the exhaust manifold and a pair of chambers covering the inlet ports to the engine, of a riser section connected with the carburetor and forming the first heating stage of the mixture, an inverted U-shaped casting forming intake spreader arms connected with said riser section, said spreader arms casting being of metal having a relatively high heat conductivity, an enclosing jacket completely surrounding said spreader arms and spaced therefrom, said jacket being formed of metal, having relatively low heat conductivity, means for securing said jacketed spreader arms section to the exhaust manifold casting with the ends of said arms in communication with said inlet chambers and means for passing controlled amounts of exhaust gases through said jacket.

2. In an internal combustion engine, the combination with an integral casting, comprising the exhaust manifold and a pair of chambers covering the inlet ports to the engine, of a riser section connected with the carburetor and forming the first heating stage of the mixture, an inverted U-shaped casting forming intake arms connected with said riser section, said casting being of metal having a relatively high heat conductivity, an enclosing jacket completely surrounding said spreader arms and spaced therefrom, said jacket being of stamped sheet metal, having relatively low heat conductivity, means for securing said spreader arms section to the exhaust manifold casting with the ends of said arms in communication with said inlet chambers, and a connecting pipe between said exhaust manifold and the spreader arms jacket for admitting predetermined amounts of exhaust gases to the latter whereby said spreader arms are completely surrounded and heated by exhaust gases.

3. In an internal combustion engine, the combination with an exhaust manifold cast integrally with inlet chambers covering the inlet ports of the engine, of an integral inverted U-shaped spreader arm casting, said spreader arms being flattened in the plane of the arms and provided with terminal lateral openings communicating with said inlet chambers, a jacket enclosing said spreader arms and spaced therefrom, said jacket comprising two sheet metal punched and stamped members secured together about their peripheries, a riser adapted to be connected with said spreader arms mid-way of the ends thereof, the connection or opening between the riser and spreader arms being in the flattened side of the latter, a heater and mixer connecting between said riser and the carburetor, and pipe connections leading from said exhaust manifold to said jacket and to the heater and mixer respectively, whereby exhaust gases are utilized for simultaneously heating the mixture passing through said heater and mixer and through said spreader arms.

4. In an internal combustion engine, the combination with laterally opening inlet chambers covering the intake ports of an inverted U-shaped intake manifold member, said manifold member being flattened in cross-section in the plane of the arms and provided with terminal lateral openings to register with said intake chambers, a jacket of stamped sheet metal completely enclosing said intake manifold and spaced therefrom, said jacket being removably attached to and provided with openings adapted to register with the openings in said manifold members and with said inlet chamber openings, and means for securing the intake manifold member to the openings in said inlet chambers with said jacket interposed with corresponding openings in register.

5. In an internal combustion engine, the combination with an exhaust manifold, of an intake manifold, including an inverted U-shaped casting forming spreader arms, the conduit in said spreader arms being flattened in cross section, a carburetor located below and between said spreader arms, a conduit extending downward from the bend of said spreader arms, said conduit including a jacketed heater and mixer, a pipe connection from the exhaust manifold for conducting exhaust gases through the jacket of said heater and mixer, a jacket of sheet metal enclosing said spreader arms and a pipe connection from said exhaust manifold to said jacket for utilizing exhaust gases for heating said flattened U-shaped arms, whereby the mixture is heated in successive stages.

6. In an internal combustion engine, the combination with an exhaust manifold, of an intake manifold including a riser section connected with an inverted vertically disposed U-shaped spreader arm section, a jacketed heater and mixer in said riser section, adapted to be heated by exhaust gases for one heating stage, said inverted U-shaped spreader arms section being formed as a casting of bronze, in which the spreader arms are uniformly flattened in cross-section in the plane of the arms, a two-part sheet steel jacket completely enclosing said spreader arms, the parts of said jacket being united in a plane parallel to the spreader arms and so shaped as to be substantially uniformly spaced therefrom, a pipe connection between said exhaust manifold and one arm of said U-shaped jacket for admitting exhaust gases and an opening in the other arm of the jacket for the exhaust gases to pass out, whereby exhaust gases may circulate about said spreader arms from end to end for heating the same as a second heating stage the passage for the flow of the exhaust gases for heating purposes being so proportioned as to control the temperature limits to produce, maintain and deliver a superheated dry gaseous mixture to the engine.

7. In an internal combustion engine, the combination of an exhaust manifold, cast integral with chambers communicating with the inlet ports of the engine, an intake manifold provided with spreader arms which are secured to and adapted to communicate with said chambers, a jacket for exhaust gases enclosing said spreader arms, the walls of said jacket being interposed between the exhaust manifold casting and the spreader arms, whereby the transfer of heat from metal to metal of the respective manifolds is interrupted.

8. The combination as called for in claim 7, in which the spreader arms of the intake manifold are cast of metal having a relatively high heat conductivity and said jacket is formed of metal having a relatively low heat conductivity.

9. In an internal combustion engine, the combination of an exhaust manifold casting, including chambers covering the inlet ports of the engine, an intake manifold provided with spreader arms which are connected with said chambers, a separately formed jacket for exhaust gases enclosing said spreader arms, the walls of said jacket being interposed between the ends of said spreader arms and said chambers, whereby the flow of heat between the exhaust manifold and the spreader arms through the metals is interrupted and means for circulating hot exhaust gases through said jacket and about said spreader arms.

10. In an internal combustion engine, the combination of an exhaust manifold, an intake manifold comprising a riser and spreader arms, an independently formed jacket for exhaust gases enclosing said spreader arms, means for securing the riser to the spreader arms with the wall of said jacket interposed therebetween and means for securing said spreader arms to the intakes of the engine with the walls of said jacket interposed, the jacket and spreader arms being of different relative heat conductivity, whereby the flow of heat between the spreader arms and the engine on the one side and the riser on the other is interrupted.

WILLIAM P. DEPPÉ.